(12) United States Patent
Foster (10) Patent No.: US 12,443,057 B2
(45) Date of Patent: Oct. 14, 2025

(54) WIRELESS COMMUNICATION EYEWEAR DEVICE

(71) Applicant: Burgess Foster, Grosse Pointe Woods, MI (US)

(72) Inventor: Burgess Foster, Grosse Pointe Woods, MI (US)

( * ) Notice: Subject to any disclaimer, the term of this patent is extended or adjusted under 35 U.S.C. 154(b) by 551 days.

(21) Appl. No.: 17/884,863

(22) Filed: Aug. 10, 2022

(65) Prior Publication Data
US 2024/0053621 A1 Feb. 15, 2024

(51) Int. Cl.
*G02C 11/00* (2006.01)
*G02C 5/14* (2006.01)
*H04M 1/60* (2006.01)

(52) U.S. Cl.
CPC ............ *G02C 11/10* (2013.01); *G02C 5/14* (2013.01); *H04M 1/6066* (2013.01)

(58) Field of Classification Search
CPC ......... G02C 11/10; G02C 5/14; H04M 1/6066
USPC ....................................................... 351/158
See application file for complete search history.

(56) References Cited

U.S. PATENT DOCUMENTS

| | | | |
|---|---|---|---|
| 2010/0110368 A1* | 5/2010 | Chaum | G02C 11/10 351/158 |
| 2012/0133885 A1* | 5/2012 | Howell | G02C 5/146 351/158 |
| 2013/0242262 A1* | 9/2013 | Lewis | H04L 5/0073 351/209 |

* cited by examiner

*Primary Examiner* — Sharrief I Broome
(74) *Attorney, Agent, or Firm* — PatentFile, LLC; Bradley C. Fach; Steven R. Kick (57) ABSTRACT

A wireless communication glasses device is provided that is configured to provide wireless communication with electronic devices. The device may include a first temple that may be pivotally coupled to a first rim, and a second temple may be pivotally coupled to a second rim. A first bone conduction transducer may be coupled to the first temple, and a second bone conduction transducer may be coupled to the second temple. A wireless module may be in electronic communication with the bone conduction transducers. A power source may be configured to provide power to the wireless module, and the wireless module may provide power to the bone conduction transducers. A magnetic power coupler may be in electronic communication with the power source, and the magnetic power coupler may be configured to be magnetically coupled to a power cord.

20 Claims, 4 Drawing Sheets

WIRELESS COMMUNICATION EYEWEAR DEVICE

FIELD OF THE INVENTION

This patent specification relates to the field of eyewear devices. More specifically, this patent specification relates to an eyewear device that is configured to provide wireless communication with electronic devices.

BACKGROUND

Many individuals choose to listen to music, podcasts, and other auditory entertainment. While some use dedicated devices, such as MP3 players, others utilize their smartphone to store and play the auditory entertainment to listening devices, such as wired or wireless headphones and ear buds. Unfortunately, these listening devices block and diminish environmental sounds which can be detrimental to the safety of the user. Additionally, these devices also do not function well in noisy environments which can cause the user to turn the volume up to unsafe levels.

Many individuals also choose or need to wear eyewear, such as sunglasses, blue light blocking glasses, and vision correcting glasses. Individuals that utilize both eyewear and listening devices often find it difficult to keep up with both products which can result in loss, damage, entanglement, and frustration.

Therefore, a need exists for novel eyewear devices and listening devices which do not suffer from the above-mentioned drawbacks.

BRIEF SUMMARY OF THE INVENTION

A novel wireless communication glasses device is provided. In some embodiments, the device may include a body having a first rim and a second rim that are connected by a bridge. A first temple may be pivotally coupled to the first rim, and the first temple may have a first temple tip and a first ear curve. A second temple may be pivotally coupled to the second rim, and the second temple may have a second temple tip and a second ear curve. A first bone conduction transducer may be coupled to the first temple, and a second bone conduction transducer may be coupled to the second temple. A wireless module may be in electronic communication with the first bone conduction transducer and the second bone conduction transducer. A power source may be configured to provide power to the wireless module. A magnetic power coupler may be in electronic communication with the power source, and the magnetic power coupler may be configured to be magnetically coupled to a magnetic coupling terminus of a power cord so that the magnetic power coupler provides electronic communication between the power source and the power cord.

In further embodiments, the device may include a body having a first rim and a second rim that are connected by a bridge. A first temple may be pivotally coupled to the first rim, and the first temple may have a first temple tip and a first ear curve. A second temple may be pivotally coupled to the second rim, and the second temple may have a second temple tip and a second ear curve. A first bone conduction transducer may be coupled to the first temple, and a second bone conduction transducer may be coupled to the second temple. A wireless module may be in electronic communication with the first bone conduction transducer and the second bone conduction transducer. A power source may be configured to provide power to the wireless module. An input port may be in electronic communication with the power source, and a magnetic power coupler may be in electronic communication with the input port. The magnetic power coupler may be removably coupled to the input port, and the magnetic power coupler may be configured to be magnetically coupled to a magnetic coupling terminus of a power cord so that the magnetic power coupler provides electronic communication between the power source and the power cord.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
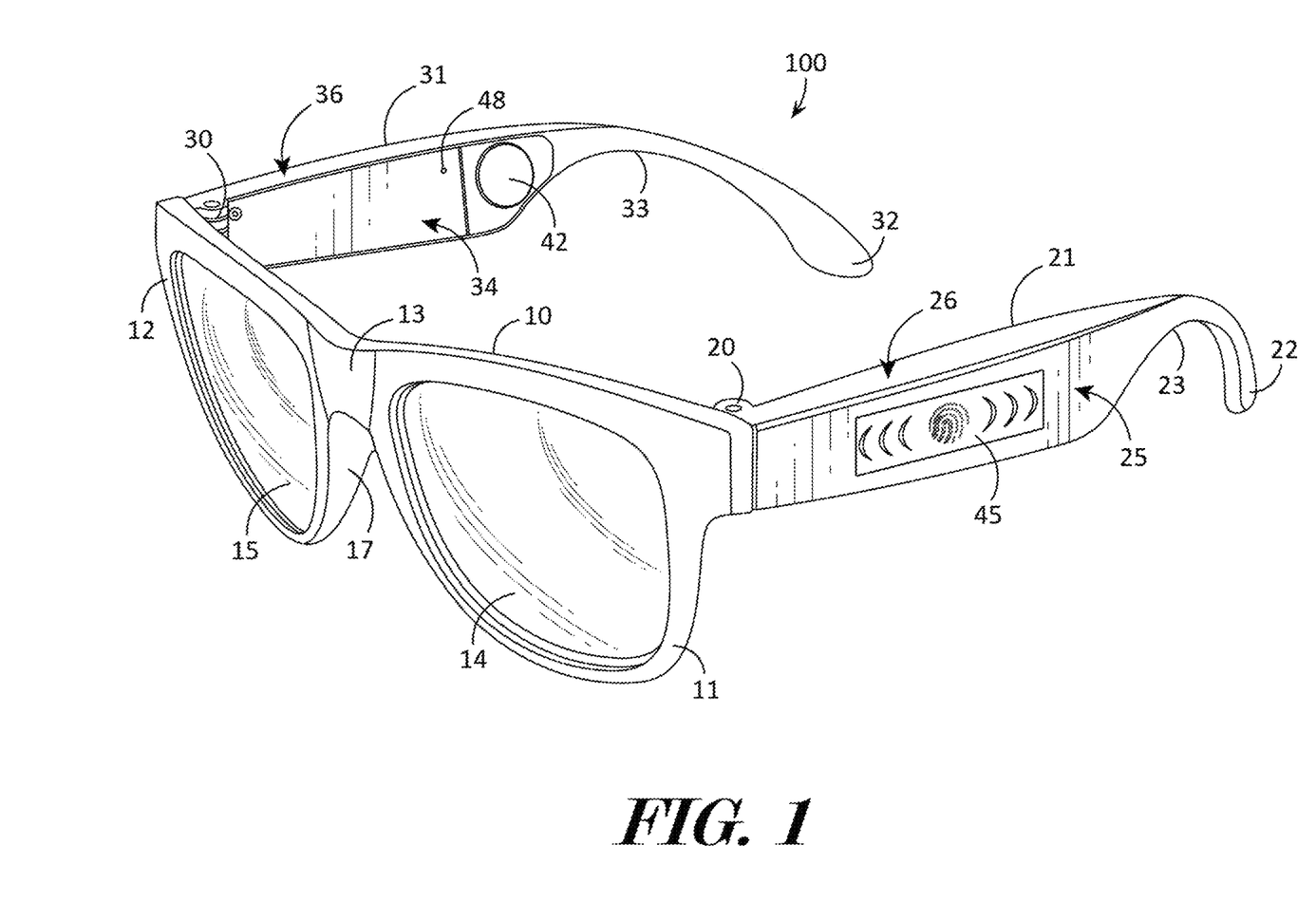
FIG. 1 depicts a first side top perspective view of an example of a wireless communication glasses device according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, more preferably within about 5% of the actual desired value and even more preferably within about 1% of the actual desired value of any variable, element or limit set forth herein.

A new wireless communication eyewear device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-4 illustrates an example of a wireless communication eyewear device ("the device") 100 according to various embodiments. In some embodiments, the device 100 may comprise a body 10 having a first rim 11 and a second rim 12 that are connected by a bridge 13. A first lens 14 may be coupled to the first rim 11, and a second lens 14 may be coupled to the second rim 12. A first temple 21 may be pivotally coupled to the first rim 11, and the first temple 21 may have a first temple tip 22 and a first ear curve 23. A second temple 31 may be pivotally coupled to the second rim 12, and the second temple 31 may have a second temple tip 32 and a second ear curve 33. A first bone conduction transducer 41 may be coupled to the first temple 21, and a second bone conduction transducer 42 may be coupled to the second temple 31. A wireless module 43 may be in electronic communication with the first bone conduction transducer 41 and the second bone conduction transducer 42. A power source 44 may be configured to provide power to the wireless module 43, to the first bone conduction transducer 41, and to the second bone conduction transducer 42. A magnetic power coupler 51 may be in electronic communication with the power source 44, and the magnetic power coupler 51 may be configured to be magnetically coupled to a magnetic coupling terminus 52 of a power cord 53 so that the magnetic power coupler 51 provides electronic communication between the power source 44 and the power cord 53.

Figure 2:
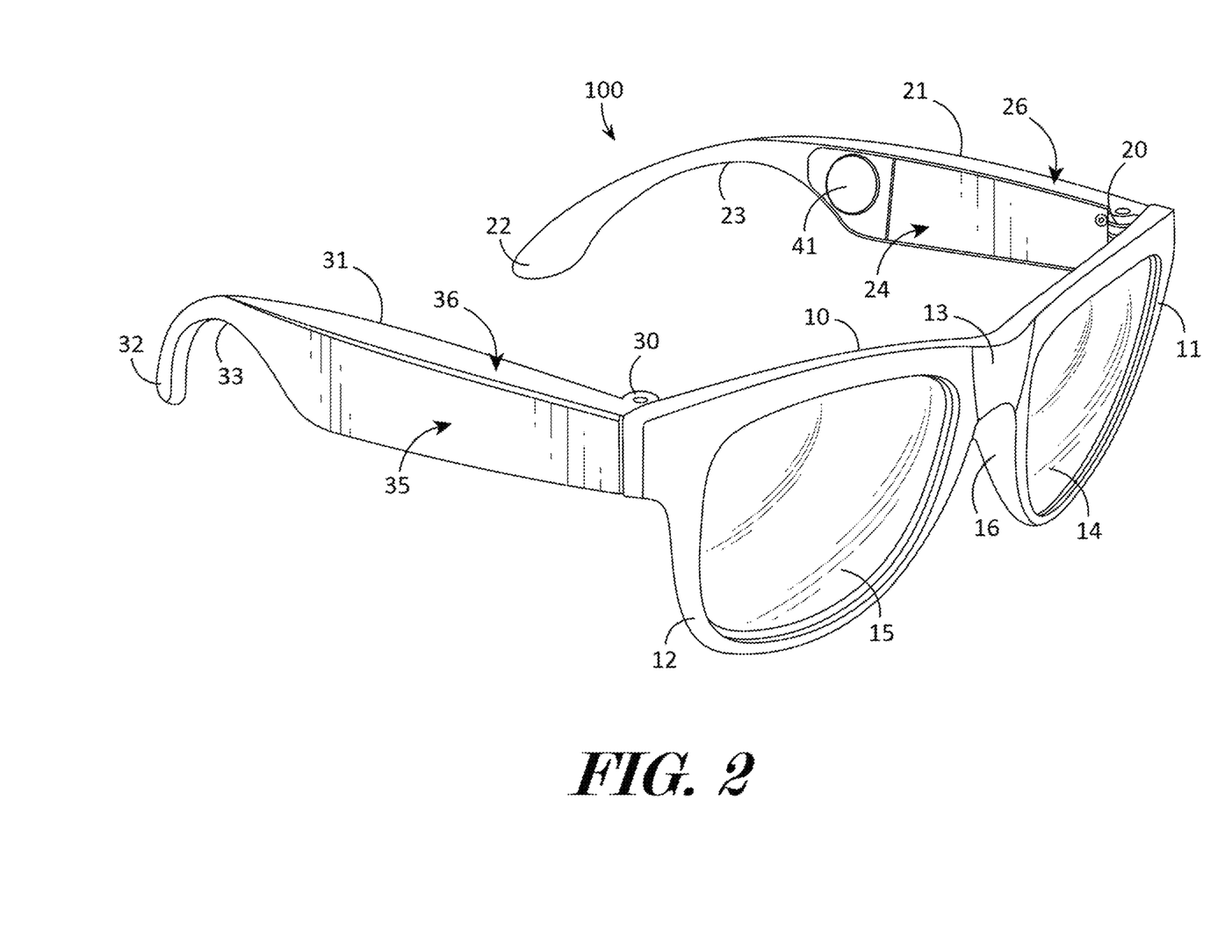
FIG. 2 illustrates a second side top perspective view of an example of a wireless communication glasses device according to various embodiments described herein.
Figure 3:
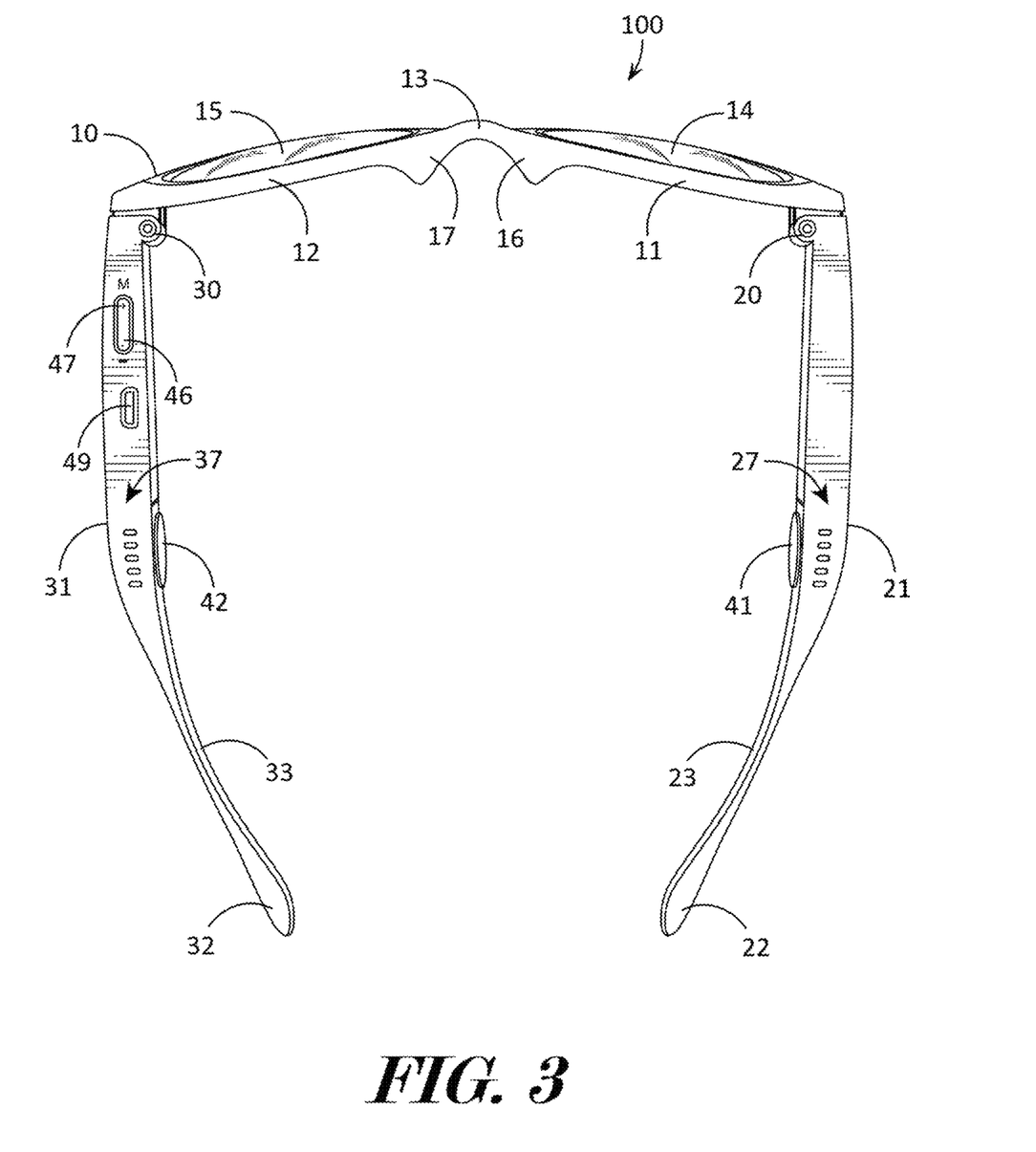
FIG. 3 shows a bottom plan view of an example of a wireless communication glasses device according to various embodiments described herein.

Generally, the body 10 and temples 21, 31, may be configured as an article of eyewear or eyeglasses, with lenses 14, 15, (clear or tinted) mounted in a frame that holds them in front of a person's eyes, typically utilizing a bridge 13 over the nose and hinged arms (known as temples 21, 31, or temple pieces) that rest over the ears. The body 10 may include nose pads 16, 17, which may rest on the nose of the wearer. In preferred embodiments, the device 100 may include a first lens 14 that may be removably coupled to the first rim 11 and a second lens 15 that may be removably coupled to the second rim 12. In further preferred embodiments, the device 100 may include a plurality of lenses 14, 15, that may be interchangeably coupled to the rims 11, 12, such as tinted or sunglass lenses, blue light blocking lenses, reading or vision correcting lenses, etc.

A first temple 21 may be pivotally coupled to the first rim 11 via a first hinge 20, and a second temple 31 may likewise be pivotally coupled to the second rim 12 via a second hinge 30. Preferably, hinges 20, 30, may comprise spring-loaded flex hinges that may each be equipped with a small spring that affords the temples 21, 31, a greater range of movement and does not limit them to the traditional, 90-degree angle. In further embodiments, hinges 20, 30, may comprise any type of hinge which may enable the temples 21, 31, to be pivotally coupled to the body 10.

Temples 21, 31, may be configured in any shape and size. A first temple 21 may have a first temple tip 22 and a first ear curve 23. A first temple tip 22 may be distal to the first hinge 20, and the first ear curve 23 may comprise a curve formed in the temple 21 which may wrap over or around a portion of the ear to form the ear contacting portion of the first temple 21. The first temple 21 may also comprise a first interior surface 24 and a first exterior surface 25 with portions of the first interior surface 24 located proximate to or in contact with the wearer of the device 100. A first temple 21 may comprise a first upper surface 26 and a first lower surface 27. Similarly, A second temple 31 may have a second temple tip 32 and a second ear curve 33. A second temple tip 32 may be distal to the second hinge 30, and the second ear curve 33 may comprise a curve formed in the temple 31 which may wrap over or around a portion of the ear to form the ear contacting portion of the second temple 31. The second temple 31 may also comprise a second interior surface 34 and a second exterior surface 35 with portions of the second interior surface 34 located proximate to or in contact with the wearer of the device 100. A second temple 31 may comprise a second upper surface 36 and a second lower surface 37.

The device 100 may comprise one or more bone conduction transducers 41, 42. In preferred embodiments, the device 100 may comprise a first bone conduction transducer 41 which may be coupled to the first temple 21 and a second bone conduction transducer 42 which may be coupled to the second temple 31. Generally, bone conduction transducers 41, 42, may enable the conduction of sound to the inner ear primarily through the bones of the skull, allowing the hearer to perceive audio content without blocking the ear canal. Bone conduction transducers 41, 42, may comprise one or more transducers which are configured to convert audio data to vibrations, which travel along the user's bone structure to the cochlea, an inner ear structure that transmits the information along the auditory nerve as a signal to the brain.

A bone conduction transducer 41, 42, may be coupled to any element of the device 100, and more preferably to an interior surface 24, 34, of a temple 21, 31. In preferred embodiments, a first bone conduction transducer 41 may be coupled to the first temple 21 proximate to the first ear curve 23 and a second bone conduction transducer 42 may be coupled to the second temple 31 proximate to the second ear curve 33. A bone conduction transducer 41, 42, may be coupled to a temple 21, 31, proximate to an ear curve 23, 33, by being coupled within one inch of the ear curve 23, 33, including being coupled in contact with the ear curve 23, 33.

Figure 4:
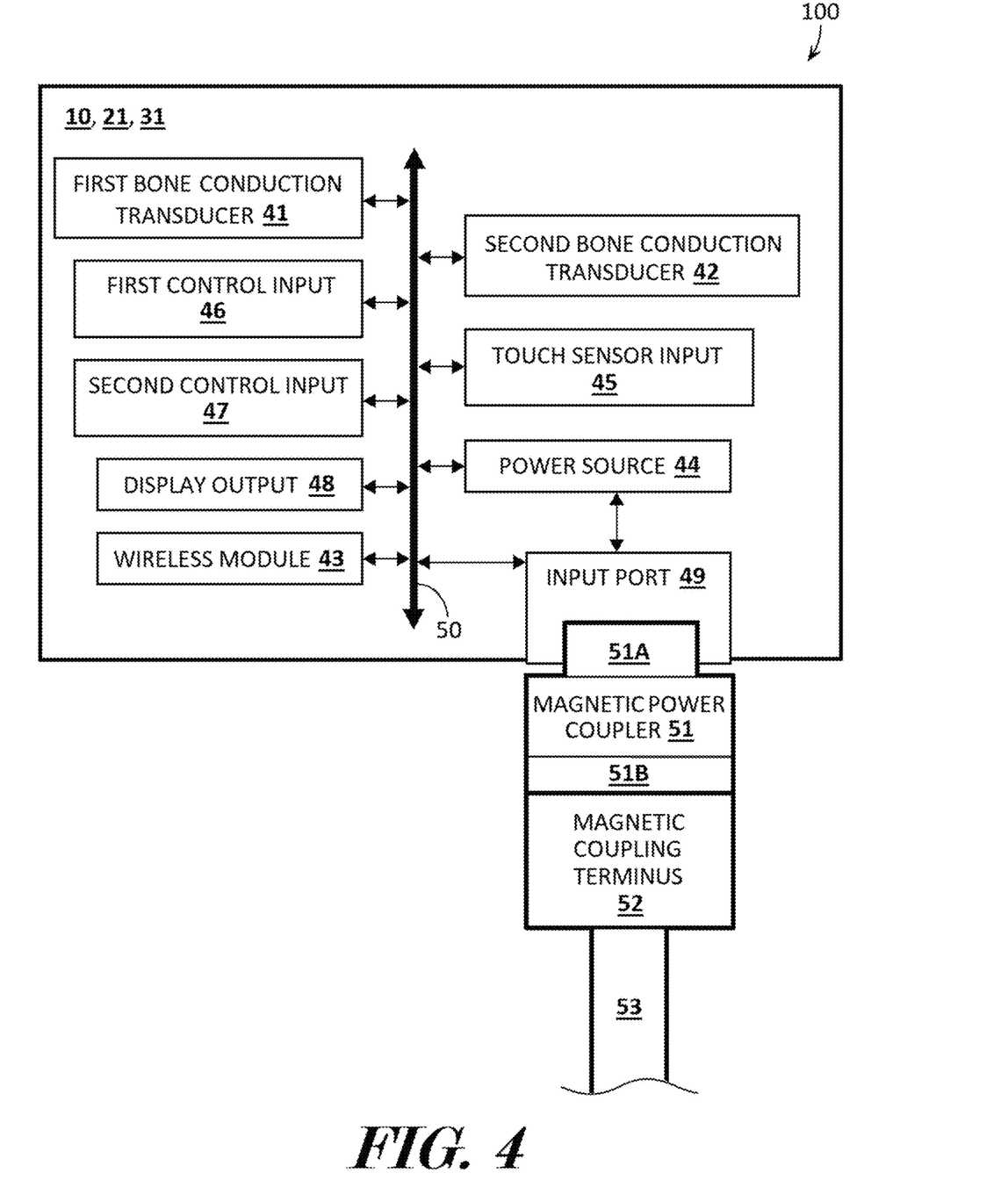
FIG. 4 depicts a schematic diagram of an example of a wireless communication glasses device according to various embodiments described herein.

In some embodiments, the device 100 may comprise a wireless module 43 which may be in electronic communication with a first bone conduction transducer 41 and a second bone conduction transducer 42. Generally, a wireless module 43 may enable wireless electronic communication between the device 100 and an electronic device, such as a smartphone, tablet computer, laptop computer, and other computing devices having wireless communication capabilities. As an example, a wireless module 43 may comprise a CSR8635 Stereo ROM Solution/Fully Qualified Single-chip Bluetooth module made by BlueCore. The wireless module 43 may communicate power from the power source 44 to the bone conduction transducers 41, 42, so that the bone conduction transducers 41, 42, are operable by the wireless module 43. Generally, by modulating the power provided to the bone conduction transducers 41, 42, the wireless module 43 may configured to reproduce sound to a user via the bone conduction transducers 41, 42.

In some embodiments, audio data may be wirelessly communicated from an electronic device paired with the device 100 to its wireless module 43, and the wireless module 43 may then operate the bone conduction transducers 41, 42, to reproduce sounds described by the audio data. For example, music and video playing on the electronic device 100 may have their sound data output to a user of the device 100 via the bone conduction transducers 41, 42. In further embodiments, user input provided to the device 100 may be communicated from the wireless module 43 to an electronic device that is paired with the device 100 so that one or more functions of the electronic device may be operated by the user's interaction with the device 100. For example, user input received via a touch sensor 45, a first control input 46, and a second control input 47 of a device 100, may be communicated to the electronic device that is paired with the device 100 so that the user may control playback, answer phone calls, operate a digital assistant, and perform other functions of the electronic device.

In some embodiments, a wireless module 43 may operate with a Bluetooth wireless technology standard using specifications which may be formalized by the Bluetooth Special Interest Group (SIG) such as Bluetooth v1.0 and v1.0B, Bluetooth v1.1, Bluetooth v1.2, Bluetooth v2.0+EDR, Bluetooth v2.1+EDR, Bluetooth v3.0+HS, Bluetooth v4.0, Bluetooth v4.1, Bluetooth v4.2, and Bluetooth v5. In some embodiments, a wireless module 43 may be configured to operate using Bluetooth Advanced Audio Distribution Profile (A2DP) transfer standard. However, it should be understood that any number of suitable wireless data communication protocols, techniques, or methodologies can be supported by the wireless module 43, including, without limitation: RF; IrDA (infrared); cellular band protocols; Bluetooth; ZigBee (and other variants of the IEEE 802.15 protocol); IEEE 802.11 (Wi-Fi or any variation); IEEE 802.16 (WiMAX or any other variation); etc.

In some embodiments, the device 100 may comprise a touch sensor 45 which may be in electronic communication with the wireless module and which may be configured to receive user input and to communicate the input to a wireless module 43. Generally, a touch sensor 45 may comprise an electronic sensor used in detecting and recording physical touch, such as a capacitive touch sensor, a resistive touch sensor, or any other type of touch sensor which may detect touch from a user and which may communicate the detection as touch data to a wireless module 43. In some embodiments, a touch sensor 45 may be configured to detect tap type touches, slide type touches, touch and hold type touches, or any other type of touch which may be registered as touch data.

In preferred embodiments, a touch sensor 45 may detect user input and communicate the user input to the wireless module 43 and the wireless module 43 in turn may communicate the input to an electronic device that is in communication with the device 100 in order to control one or more functions of the electronic device. As an example, a user may skip a playing song or answer a phone call on an electronic device that is in communication with the device 100 by sliding their finger in a first direction along a length of the touch sensor 45 and the user may select a previous song or end/reject a phone call on the electronic device that is in communication with the device 100 by sliding their finger in a second direction along a length of the touch sensor 45. As another example, a user may tap a touch sensor 45 to play or pause a song playing on the electronic device that is in communication with the device 100. As a further example, a user may press and hold a touch sensor 45 for a short period of time in order to activate voice control on the electronic device that is in communication with the device 100.

A touch sensor 45 may be coupled to any element of the device 100. In some embodiments, a touch sensor 45 may be coupled to a first temple 21 and/or a touch sensor 45 may be coupled to a second temple 31. In preferred embodiments, a touch sensor 45 may be coupled to a first exterior surface 25 of a first temple 21 and/or a sensor 45 may be coupled to a second exterior surface 35 of a second temple 31.

A touch sensor 45 may be configured in any shape and size. Preferably, a touch sensor 45 may be elongated in shape so as to extend a length of a temple 21, 31, to which it is coupled between the hinge 20, 30, and ear curve 23, 33. For example, a touch sensor 45 may have a length dimension that is at least 200 percent greater than its width and/or height dimension.

In some embodiments, the device 100 may comprise one or more control inputs, such as a first control input 46, a second control input 47, etc., that a user may interact with to provide user input data. Example control inputs 46, 47, include turnable control knobs, depressible button type switches, a key pad, slide type switches, rocker type switches, or any other suitable input. In some embodiments, control inputs 46, 47, may be configured to control one or more functions of the device 100. For example, a user may turn the device 100 on or off by pressing and holding a first control input 46 for a short period of time, such as for a few seconds. As another example, a user put the device 100 in pairing mode by pressing and holding a second control input 47 for a short period of time. As a further example, a user may cause the output or volume of the bone conduction transducers 41, 42, to be increased or decreased by tapping a corresponding control input 46, 47.

In some embodiments, the device 100 may comprise one or more display outputs 48 which may be configured to visually output or display information to a user. For example, a display output 48 may be configured to visually indicate if the device 100 is in pairing mode, if the power source 44 is low on power, and if the power source 44 if fully charged. A display output 48 may be positioned anywhere in the device 100, such as by being coupled to an interior surface 24, 34, of a temple 21, 31.

In preferred embodiments, a display output 48 may comprise a light emitting device, such as a light-emitting diode (LED). In still further embodiments, a display output 48 may comprise a Liquid crystal display (LCD), Light-emitting diode display (LED), Electroluminescent display (ELD), Electronic paper, E Ink, Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), and/or any other device or method which may be configured to provide visual information to a user.

A power source 44 may be configured to provide power to the wireless module 43, to the first bone conduction transducer 41, and to the second bone conduction transducer 42. A power source 44 may be coupled to or located within one or both temples 21, 31. Generally, a power source 44 may provide electrical power to any component that may require electrical power. A power source 44 may comprise a battery, such as a lithium ion battery, nickel cadmium battery, alkaline battery, or any other suitable type of battery, a fuel cell, a capacitor, a super capacitor, or any other type of electricity storing and/or releasing device. In further embodiments, a power source 44 may comprise a kinetic or piezo electric battery charging device, a solar cell or photovoltaic cell, and/or inductive charging or wireless power receiver. In further embodiments, a power source 44 may comprise a power charging and distribution module which may be configured to control the recharging of the power source 44, discharging of the power source 44, and/or distribution of power to one or more components of the device 100 that may require electrical power.

In some embodiments, the device 100 may comprise an input port 49 which may be configured to mate with a complementary external plug member, such as which may be used to supply electrical power to the device 100. The input port 49 may be in electrical communication with the power source 44 via a local interface 50. Once the input port 49 is mated with a complementary external plug member, electrical power may be communicated from the external plug member, through the input port 49, and to the power source 44 thereby allowing the power source 44 to be charged or recharged by the external plug member. An input port 49 may be coupled to a temple 21, 31, or to any other element of the device 100.

In preferred embodiments, an input port 49 may comprise a USB connector such as a female micro-USB or female mini-USB. In other embodiments, an input port 49 may comprise a male or female Type A USB plug, a Type B USB plug, a Mini-A USB plug, a Mini-B USB plug, a Micro-A USB plug, a Micro-B USB plug, a Micro-B USB 3.0 plug, a ExtMicro USB plug, a Lightning plug, a 30-pin dock connector, a Pop-Port connector, a Thunderbolt plug, a Firewire plug, a Portable Digital Media Interface (PDMI) plug, a coaxial power connector plug, a barrel connector plug, a concentric barrel connector plug, a tip connector plug, or any other plug, connector, or receptacle capable of enabling electrical communication.

The electrical components and elements (41, 42, 43, 44, 45, 46, 47, 48, and 49) may be communicatively coupled via a local interface 50. A local interface 50 can be, for example but not limited to, one or more buses, circuit boards, wiring, wire harnesses, or other wired or wireless connections, as is known in the art. The local interface 50 can have additional elements, which are omitted for simplicity, such as controllers, buffers (caches), drivers, repeaters, and receivers, among many others, to enable communications. Further, the local interface 50 may include address, control, and/or data connections to enable appropriate communications among the aforementioned components.

In some embodiments, the device 100 may comprise one or more magnetic power couplers 51 which may be configured to be in electronic communication with the power source 44. In preferred embodiments, a magnetic power coupler 51 may be removably coupled to an input port 50 which may enable the magnetic power coupler 51 to be in electronic communication with the power source 44. In further embodiments, a magnetic power coupler 51 may be coupled directly to a local interface 50 which may enable the magnetic power coupler 51 to be in electronic communication with the power source 44.

Generally, a magnetic power coupler 51 may be in electronic communication with the power source 44, and the magnetic power coupler 51 may be configured to be magnetically coupled to a magnetic coupling terminus 52 of a power cord 53 so that the magnetic power coupler 51 provides electronic communication between the power source 44 and the power cord 53. In preferred embodiments, a magnetic power coupler 51 may comprise a male plug 51A, such as a male micro USB plug, which may be removably couple to the input port 49 by being inserted into the input port 49, and the magnetic power coupler 51 may comprise a magnetic head 51B. The magnetic head 51B may be configured to be magnetically coupled to the magnetic coupling terminus 52 of a power cord 53, and when coupled, the magnetic head 51B may communicate power from the magnetic coupling terminus 52 to the local interface 50 and ultimately to the power source 44. Preferably, the device 100 may comprise two, three, or more magnetic power couplers 51 which may be removably and interchangeably coupled to an input port 49.

In preferred embodiments, the device 100 may comprise an ingression protection rating of IPX4 resistance, such as to be resistant to water splashes from any direction. In further preferred embodiments, the device 100 may comprise an ingression protection rating of IPX5 water resistance, such as to resist a sustained, low-pressure water jet spray.

While some exemplary shapes and sizes have been provided for elements of the device 100, it should be understood to one of ordinary skill in the art that the body 10, first temple 21, second temple 31, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A wireless communication glasses device, the device comprising:
   a body having a first rim and a second rim that are connected by a bridge;
   a first temple pivotally coupled to the first rim, the first temple having a first temple tip and a first ear curve;
   a second temple pivotally coupled to the second rim, the second temple having a second temple tip and a second ear curve;
   a first bone conduction transducer coupled to the first temple;
   a second bone conduction transducer coupled to the second temple;
   a wireless module in electronic communication with the first bone conduction transducer and the second bone conduction transducer;
   a power source configured to provide power to the wireless module; and
   a magnetic power coupler in electronic communication with the power source, the magnetic power coupler configured to be magnetically coupled to a power cord so that the magnetic power coupler provides electronic communication between the power source and the power cord.

2. The device of claim 1, further comprising an input port.

3. The device of claim 2, wherein the input port is coupled to one of the first temple and second temple.

4. The device of claim 2, wherein input port is in electronic communication with the power source, and wherein the magnetic power coupler is coupled to the input port.

5. The device of claim 2, wherein input port comprises a USB connector.

6. The device of claim 1, further comprising a touch sensor in electronic communication with the wireless module.

7. The device of claim 6, wherein the touch sensor is coupled to one of the first temple and second temple.

8. The device of claim 1, wherein the wireless module is configured to operate with a Bluetooth wireless technology standard.

9. The device of claim 8, wherein the wireless module is configured to operate using Bluetooth Advanced Audio Distribution Profile (A2DP) transfer standard.

10. The device of claim 1, wherein the first bone conduction transducer is coupled to the first temple proximate to the first ear curve, and wherein the second bone conduction transducer is coupled to the second temple proximate to the second ear curve.

11. The device of claim 1, further comprising a first lens that is coupled to the first rim, and further comprising a second lens that is coupled to the second rim.

12. A wireless communication glasses device, the device comprising:
   a body having a first rim and a second rim that are connected by a bridge;
   a first temple pivotally coupled to the first rim, the first temple having a first temple tip and a first ear curve;
   a second temple pivotally coupled to the second rim, the second temple having a second temple tip and a second ear curve;
   a first bone conduction transducer coupled to the first temple;
   a second bone conduction transducer coupled to the second temple;
   a wireless module in electronic communication with the first bone conduction transducer and the second bone conduction transducer;
   a power source configured to provide power to the wireless module;
   an input port in electronic communication with the power source; and
   a magnetic power coupler in electronic communication with the input port, wherein the magnetic power coupler is coupled to the input port, and wherein the magnetic power coupler is configured to be magnetically coupled to a power cord so that the magnetic power coupler provides electronic communication between the power source and the power cord.

13. The device of claim 12, wherein the input port is coupled to one of the first temple and second temple.

14. The device of claim 12, wherein input port comprises a USB connector.

15. The device of claim 12, further comprising a touch sensor in electronic communication with the wireless module.

16. The device of claim 15, wherein the touch sensor is coupled to one of the first temple and second temple.

17. The device of claim 12, wherein the wireless module is configured to operate with a Bluetooth wireless technology standard.

18. The device of claim 17, wherein the wireless module is configured to operate using Bluetooth Advanced Audio Distribution Profile (A2DP) transfer standard.

19. The device of claim 12, wherein the first bone conduction transducer is coupled to the first temple proximate to the first ear curve, and wherein the second bone conduction transducer is coupled to the second temple proximate to the second ear curve.

20. The device of claim 12, further comprising a first lens that is coupled to the first rim, and further comprising a second lens that is coupled to the second rim.

\* \* \* \* \*